United States Patent [19]
Johnson

[11] Patent Number: 5,924,092
[45] Date of Patent: Jul. 13, 1999

[54] COMPUTER SYSTEM AND METHOD WHICH SORT ARRAY ELEMENTS TO OPTIMIZE ARRAY MODIFICATIONS

[75] Inventor: Ross Evan Johnson, Rochester, Minn.

[73] Assignee: International Business Machines Corporation, Armonk, N.Y.

[21] Appl. No.: 08/797,760

[22] Filed: Feb. 7, 1997

[51] Int. Cl.⁶ .................................................. G06F 7/00
[52] U.S. Cl. .................................. 707/7; 707/101
[58] Field of Search ......................... 707/7, 100, 101, 707/102; 711/170–173

[56] References Cited

U.S. PATENT DOCUMENTS

| | | | |
|---|---|---|---|
| 3,670,307 | 6/1972 | Arnold et al. | 395/458 |
| 4,467,421 | 8/1984 | White | 395/445 |
| 4,593,324 | 6/1986 | Ohkubo et al. | 358/261 |
| 4,782,325 | 11/1988 | Jeppsson et al. | 341/55 |
| 5,235,695 | 8/1993 | Pence | 395/497.03 |
| 5,237,460 | 8/1993 | Miller et al. | 360/8 |
| 5,239,298 | 8/1993 | Wei | 341/51 |
| 5,247,638 | 9/1993 | O'Brien et al. | 395/888 |
| 5,278,970 | 1/1994 | Pence | 395/425 |
| 5,305,295 | 4/1994 | Chu | 369/30 |
| 5,313,604 | 5/1994 | Godwin | 395/489 |
| 5,357,614 | 10/1994 | Pattisam et al. | 395/250 |
| 5,481,701 | 1/1996 | Chambers, IV | 395/612 |
| 5,490,260 | 2/1996 | Miller et al. | 395/427 |
| 5,559,978 | 9/1996 | Spilo | 395/413 |
| 5,606,706 | 2/1997 | Takamoto et al. | 395/800 |
| 5,812,817 | 9/1998 | Hovis et al. | 395/497.04 |

OTHER PUBLICATIONS

Hamacher et al., Computer Organization, 3rd Edition, 1990, p. 338.

Arnold et al., "Data Compaction Storage System", IBM Technical Disclosure Bulletin, vol. 22. No. 9, pp. 4191–4193.

*Primary Examiner*—Paul V. Kulik
*Attorney, Agent, or Firm*—Scott A. Stinebruner; Karuna Ojanen

[57] ABSTRACT

A sorting algorithm is applied to an array data structure to arrange array elements according to the predicted frequency by which those array elements are likely to be modified. Higher modification frequency array elements are arranged proximate the end of the array to minimize the number of array elements that will typically need to be updated in response to modification of these array elements, reserving the modifications that require more array elements to be updated to those array elements that have a lower likelihood of modification. A sorting algorithm suitable for use in memory compression arranges blocks for a given page in reverse order since data located proximate the beginning of a page has a higher probability of being modified than the data proximate the end of the page.

23 Claims, 6 Drawing Sheets

Logical Page

COMPUTER SYSTEM AND METHOD WHICH SORT ARRAY ELEMENTS TO OPTIMIZE ARRAY MODIFICATIONS

FIELD OF THE INVENTION

The invention generally relates to array data structures implemented in computer and data processing systems, and in particular, to the manipulation of data structures in applications such as memory compression.

BACKGROUND OF THE INVENTION

An array is a common data structure used to store data in a computer or other data processing system. The array data structure typically arranges a plurality of array elements in a list, with each array element accessed via a unique index. For example, many computer memory systems are organized into arrays, with individual memory locations or groups of memory locations functioning as array elements, and with each element having a unique memory address functioning as an index thereto.

A primary benefit of the array data structure is its random access nature, which permits individual elements to be accessed quickly, e.g., by maintaining pointers or indices to the elements. However, one drawback to the array data structure is that modifications to the array which change the overall size of the array elements are difficult to handle in an efficient manner. In particular, it is desirable for any data structure to be compact and utilize no more memory space than necessary. Thus, when an array element is modified, e.g., by deleting the element, adding the element to the array, or, for arrays which support variable size elements, changing the size of the element, each element which follows the modified element must often be updated, or moved, from its previous location in memory. Moving elements, however, may require a time consuming memory transfer operation, thereby degrading the performance of the memory system.

In the alternative, each array element may be "padded" with unused memory locations, thereby enabling elements to "grow" or "shrink" without affecting the starting addresses of the subsequent elements in the array. However, this technique can be extremely wasteful because unused memory is interspersed within the array. Moreover, this technique still is not able to accommodate array element deletions and additions, nor larger array element modifications that overrun the available padding.

One particular application in which arrays are utilized is in memory compression, where high storage density and fast memory transfer operations are desired. In some memory compression applications, pages of data are arranged into arrays of blocks which are then compressed into frames to minimize the amount of memory that must be recompressed in response to a modification of compressed data. Whenever data in a frame is modified, the frame typically must be recompressed, which often modifies the size of the frame and/or the amount of information stored in the frame. Each frame in the page that follows the recompressed frame must often then be updated, e.g., moved and/or recompressed, to optimize compression of the page. When data stored in a frame near the beginning of a page is modified, often most or all of the frames in the page must be updated, which may have a significant impact on the overall performance of the memory system.

Therefore, a substantial need exists for a manner of minimizing performance degradations associated with modifying elements in an array, particularly in the areas of memory compression and the like.

SUMMARY OF THE INVENTION

The invention addresses these and other problems associated with the prior art in providing a manner of maintaining an array which generally sorts array elements using a sorting algorithm that relies at least in part on the predicted frequency by which those array elements are likely to be modified. Higher modification frequency array elements are arranged proximate the end of the array to minimize the number of array elements that will typically need to be updated in response to modification of these array elements, reserving the modifications that require more array elements to be updated to those array elements that have a lower likelihood of modification. Thus, the average number of array elements that need to be updated in response to a modification of any array element is reduced for the array as a whole, thereby minimizing the overall performance impact of array modifications.

While the invention is not limited as such, one particularly beneficial application of the invention is in the area of memory compression, because data proximate the beginning of a logical page of memory often changes more frequently than data proximate the end of the page. By arranging blocks of data for a given page in reverse order, the average number of blocks that must be updated whenever a block is modified may be minimized.

These and other advantages and features, which characterize the invention, are set forth in the claims annexed hereto and forming a further part hereof. However, for a better understanding of the invention, and of the advantages and features attained through its use, reference should be made to the Drawings, and to the accompanying descriptive matter, in which there is described illustrated embodiments of the invention.

DETAILED DESCRIPTION OF THE ILLUSTRATED EMBODIMENTS

The illustrated embodiments of the invention generally operate by sorting array elements according to a predicted relative frequency by which the array elements are modified, which enables modifications to array elements which affect subsequent array elements to be located toward the end of an array so as to minimize the average number of array elements affected as a result of a modification to any given array element in the array. In particular, it is often desirable to maintain array elements in a contiguous memory space with little or no unused space between elements to minimize the amount of memory occupied by the array. It should be appreciated that a contiguous memory space for an array may nonetheless be non-sequential to the extent that logical memory locations may be mapped to fixed size partitions, e.g., as shown for the compressed data partitions discussed below in conjunction with the illustrated embodiments.

Modifications to array elements which may affect subsequent elements in an array generally include modifications such as deletions of array elements and addition of new array elements. Moreover, for arrays which support variable size array elements, another modification may include changing the size of array elements.

Figure 1:
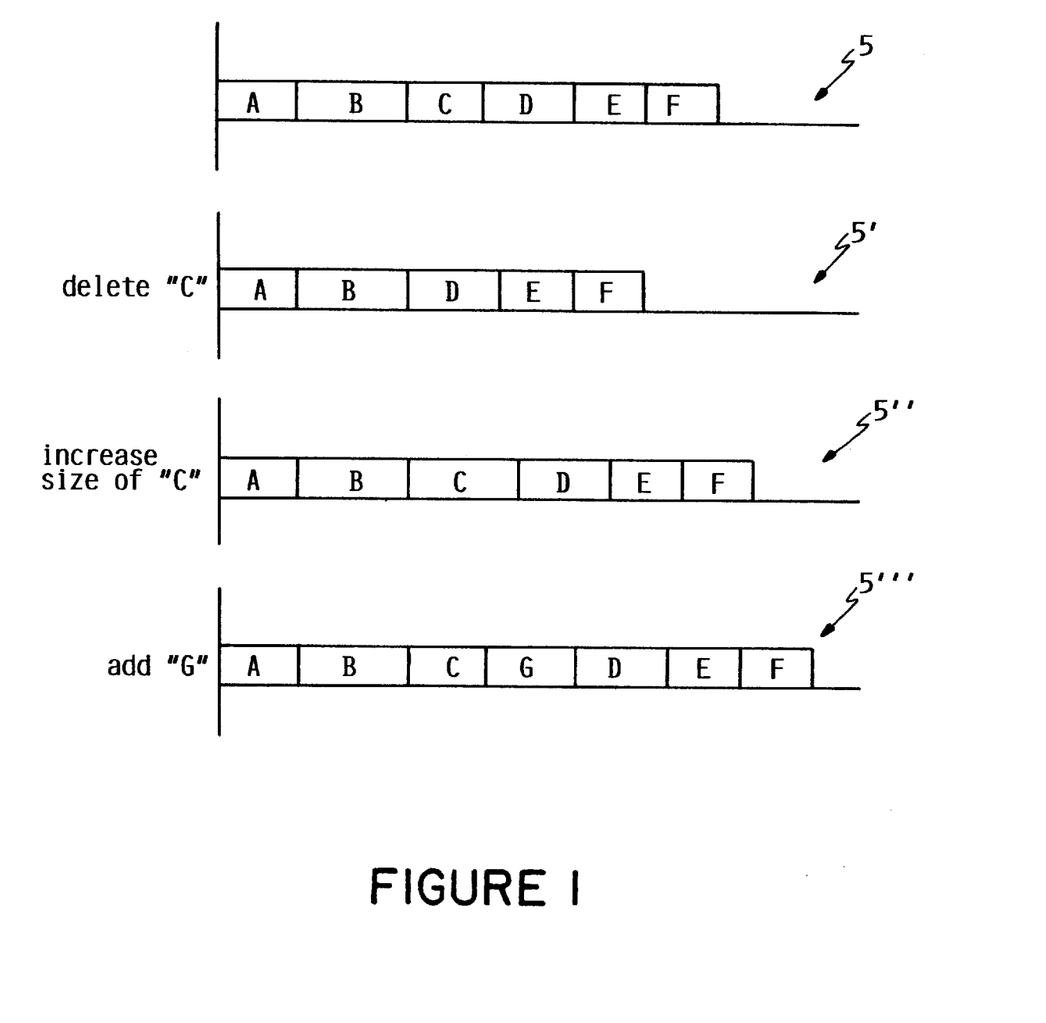
FIG. 1 is a block diagram illustrating various modifications of array elements in an array.

For example, FIG. 1 illustrates an array 5 of elements A–F that are stored in a contiguous memory space. If, for example, element C is deleted from the array, the subsequent elements in the array, elements D–F, must be moved or shifted to the left, or "down" in memory, in order to maintain the contiguous memory space, as shown by array 5'. If, for example, the size of element C is increased, elements D–F must be moved or shifted to the right, or "up" in memory, so that element C does not overflow into element D, as shown by array 5". Similarly, if a new element G is added after element C, elements D–F must be moved or shifted to the right to make room for the new element, as shown by array 5'".

The illustrated embodiments of the invention may utilize either a static or dynamic sorting algorithm to arrange array elements in terms of increasing frequency of modification. A static sorting algorithm is generally hard-coded into array handling program code so that array elements are stored and modified in a predetermined manner that is consistent with the selected sorting algorithm. When using a static algorithm, the frequency of modification for array elements may be determined through a known relationship or through empirical testing.

A dynamic sorting algorithm, on the other hand, handles both the determination of a suitable sorting algorithm and the implementation of the algorithm during handling of array operations. For example, in a database system, the modification history of records in one or more databases may be monitored in real time to enable weighting to be applied to various records or types of records which would affect future operations on the records, or which would possibly enable records to be resorted in memory as a routine maintenance function.

In the embodiment discussed below, array elements represent blocks of compressed data that are arranged into a list or array representative of a logical page of memory. One suitable computer system which is suitable for use in this regard is disclosed in U.S. Pat. No. 5,812,817, and which is incorporated by reference herein. Other computer and memory systems, as well as other memory management controllers and compression engines for use therewith may be used in the alternative.

It has been found that with many computer systems, including the above-referenced system, data proximate the beginning of a logical page of memory is more likely to be modified than data proximate the end of a logical page. For example, in some memory systems which utilize 4 KB logical pages, it has been found that the first KB, the first two 512 byte logical blocks, has roughly twice the frequency of modification of the last KB. This may occur, for example, because memory allocation operations which do not require a full page of memory, or which require multiple pages of memory but which end in the middle of a page, are typically allocated starting at the beginning of a page.

In the embodiment discussed below, logical pages are arranged into arrays of logical blocks which are stored in a compressed format in memory using a memory compression algorithm which compresses the logical blocks into a plurality of fixed size frames, e.g., 512 bytes. Whenever data within a block is modified, typically as a result of a write back operation from the cache, the frame containing the block is updated, e.g., recompressed. Moreover, if the size of the block has changed beyond that permitted the padding if any in the frame, at least one, and typically all, of the frames subsequent to the frame with the modified block is also updated. In other embodiments, the frames may be variable sizes, whereby one or more subsequent frames may not be required to be recompressed, but may only be required to be moved in response to the modification in size of a frame.

For the illustrated embodiment discussed below, a static sorting algorithm is used which arranges the logical blocks of data in a logical page in reverse order, thereby placing the last logical block at the beginning of the array, and the first logical block at the end. Consequently, the more frequent modifications to the data in the first logical block require recompression and/or moving of fewer, or no other, subsequent frames than the less frequent modifications to the data in the last logical block of a page. In general, this results in a lower average number of updated frames per data modification, and thus improved overall performance.

Consequently, the logical blocks of data are generally analogous to array elements in the illustrated embodiments. However, it should be appreciated that the elements may represent practically any types of memory blocks or segments, having any fixed or variable size.

It should also be appreciated that, while the discussion hereinafter is directed to the arrangement of compressed data in a memory compression application, the invention is not limited to this particular application. For example, array operations on other forms of data in other computer and data processing applications may be similarly benefited.

Figure 2:
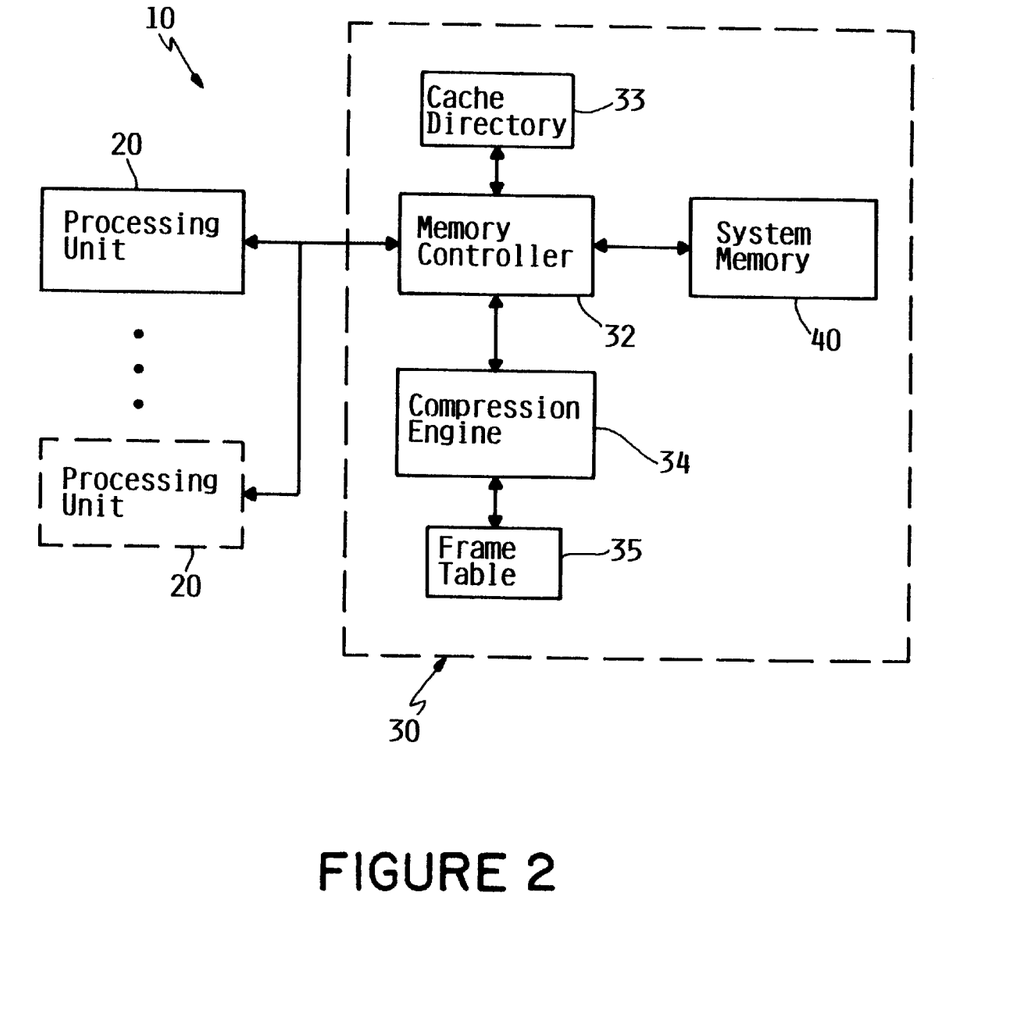
FIG. 2 is a block diagram of a computer system consistent with the principles of the present invention.

Turning now to the Drawings, wherein like parts are denoted by like numbers throughout the several views, FIG. 2 illustrates a computer system 10 consistent with the principles of the invention. Computer system 10, which is representative of many data processing systems, generally includes one or more processing units 20 coupled to a memory system 30. Other elements of computer system 10, e.g., user input devices, communication devices, information display devices, etc., are not relevant to an understanding of the invention, and are not shown separately herein.

Memory system 30 generally includes a memory controller 32 coupled between processing unit 20 and a system memory 40. Memory controller utilizes a cache directory 33 for determining what data is currently cached in the system. A compression engine 34, which relies on a frame table 35, is coupled to memory controller 32 to handle compression of data within system memory 40.

Figure 3:
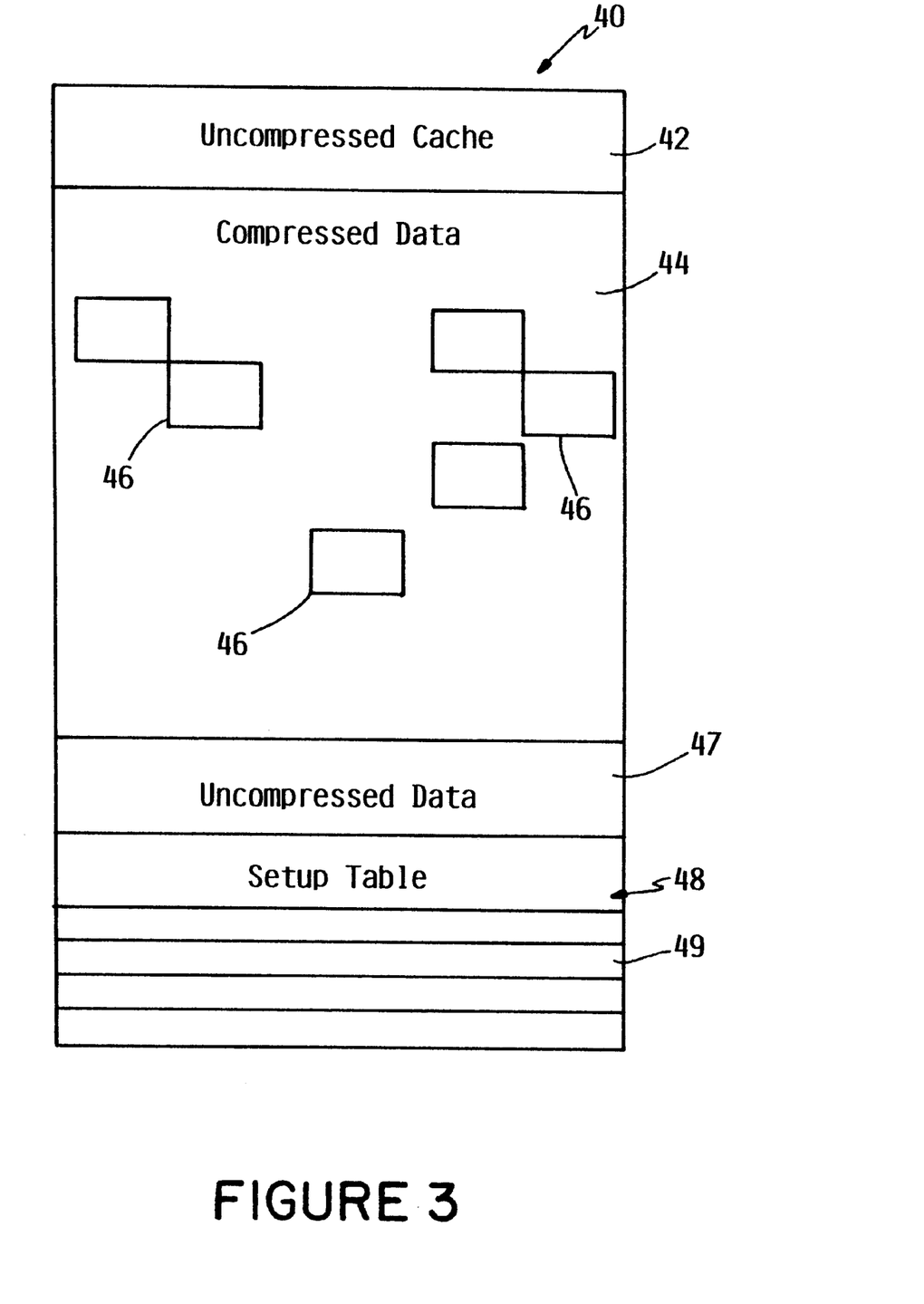
FIG. 3 is a block diagram of the memory map for the computer system of FIG. 2.

As shown in FIG. 3, system memory 40 is partitioned into a number of memory partitions, including an uncompressed cache 42, compressed data partition 44, uncompressed data partition 47 and setup table 48. It should be appreciated that these partitions may be implemented by the same or different types of memory hardware components. The bulk of logical memory is maintained in a compressed format in compressed data partition 44. Cache 42, from which much of the memory operations for the system are performed, maintains uncompressed copies of selected pages from partition 44 to optimize memory performance. A typically smaller uncompressed partition 47 may be optionally included for additional storage purposes.

Figure 4:
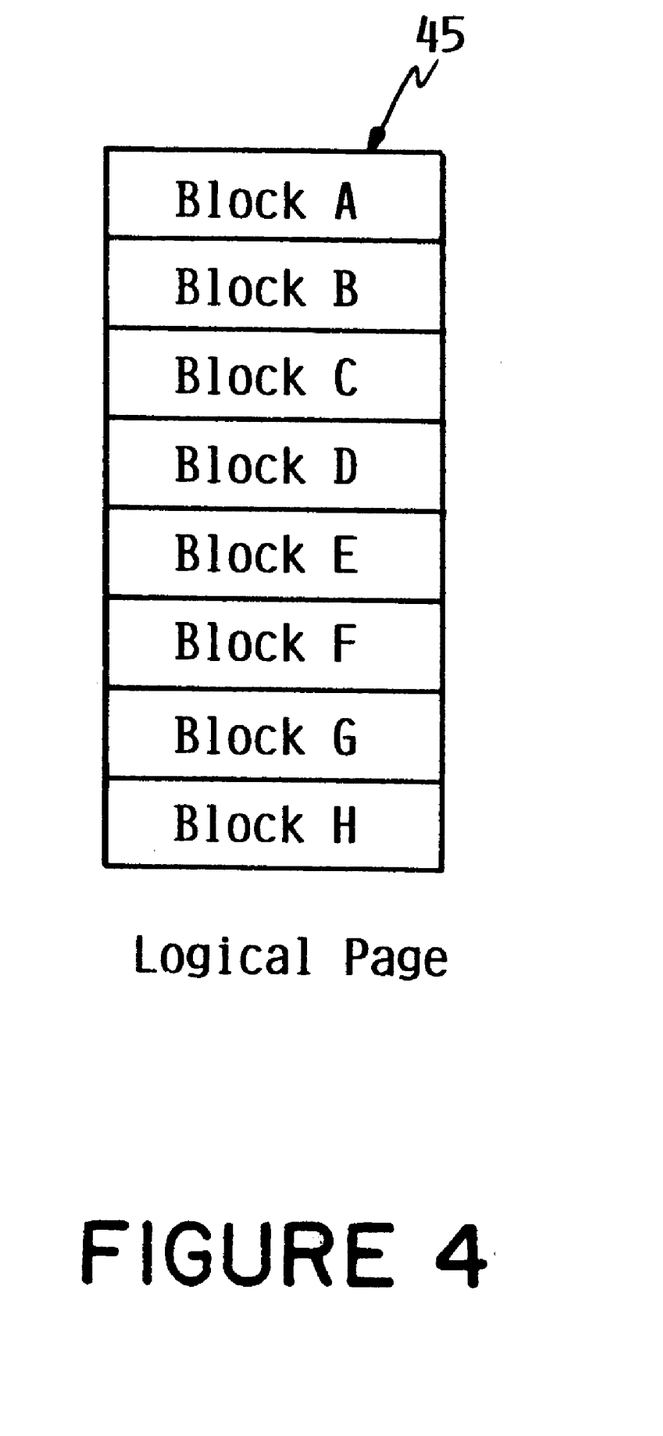
FIG. 4 is a block diagram illustrating a logical page of memory for the computer system of FIG. 2.

As shown in FIG. 4, the main memory is organized into logical pages, e.g. logical page 45, comprising a plurality of logical blocks, e.g., logical blocks A–H. For example, in the illustrated embodiment, 4 KB logical pages are used, each having eight 512 byte logical blocks. The logical pages are then stored in a compressed format comprising a chain of one or more fixed size frames, e.g., frames 46 in FIG. 3.

Figure 5:
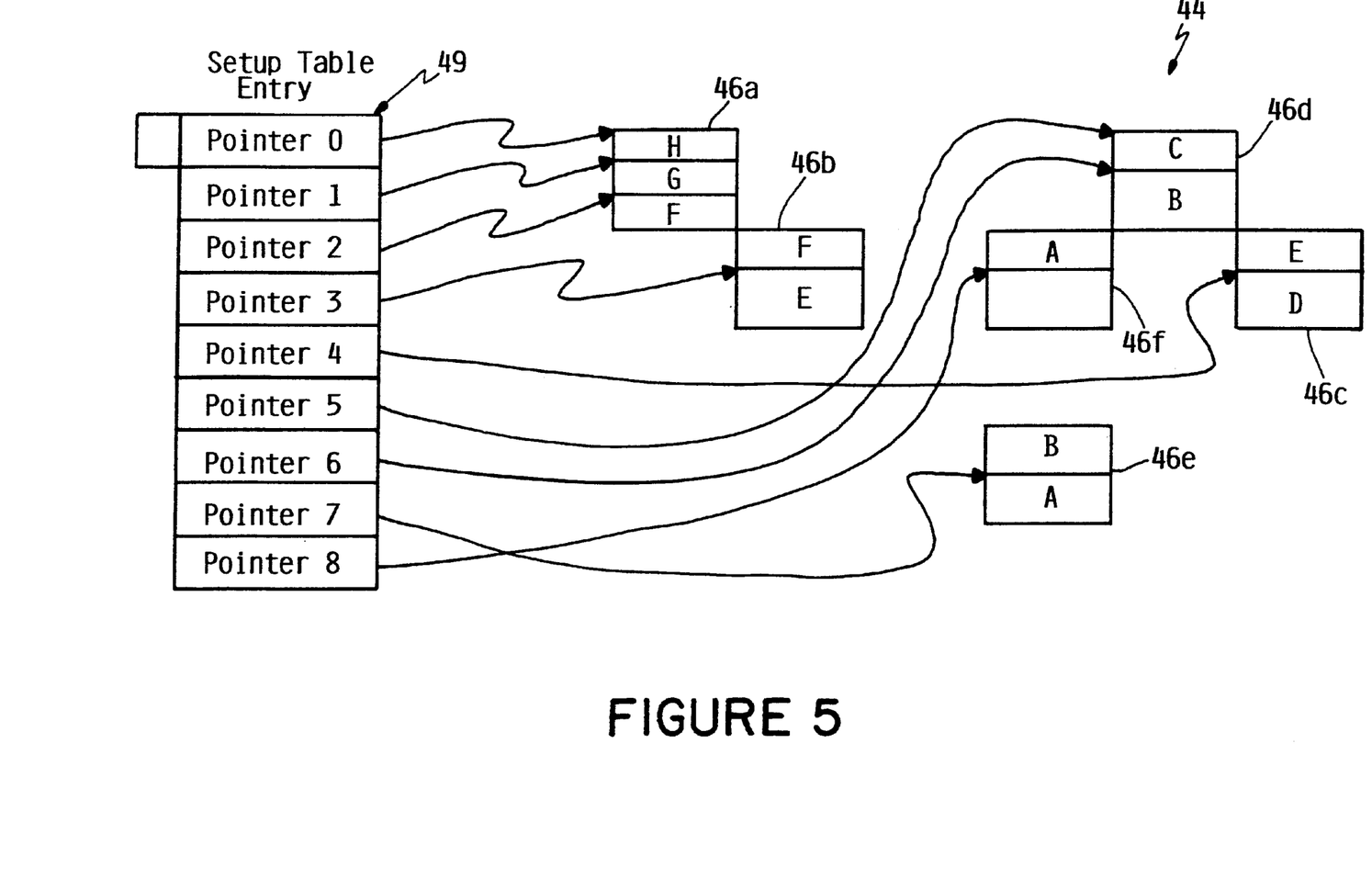
FIG. 5 is a block diagram illustrating the mapping between a setup table entry and an array of logical blocks for the computer system of FIG. 1.

Each logical page stored in the compressed data partition is accessed using an entry in setup table 48, e.g., setup table entry 49 which has n+1 pointers, where n is the number of logical blocks in the page. As shown in FIG. 5, entry 49 includes nine pointers, pointers 0–8. The first pointer, pointer 0, includes 40 bits, thereby providing 1 terabyte of address space. The remaining pointers include 32 bits, and utilize the high order byte of the first pointer such that they point within the same 4 gigabyte segment of memory. The starting addresses of frames which begin in the middles of logical blocks may be obtained, for example, by aligning frames on 512 byte boundaries, and masking the lowest 10 bits from the pointers to blocks starting in the frames. Other pointer sizes may be used to address other address spaces and page/block sizes.

Consistent with the invention, the logical blocks A–H of logical page 45 are chained together in reverse order, with the first pointer pointing to logical block H, and with each subsequent pointer pointing to the start of each preceding logical block. The last pointer, pointer 8 points to the end of logical block A.

The logical blocks are shown compressed into fixed size frames 46a–46f. It should be appreciated that the number of frames actually used to store a logical page may vary depending upon the degree to which the data in the page is compressed by the compression algorithm used.

The operation of the elements of the memory system is similar to that of the aforementioned U.S. Pat. No. 5,812, 817. Typically, most memory accesses are made to cached memory. Whenever a memory access is to a location not stored in the cache, setup table 48 is accessed to fetch the compressed data from partition 44, decompress the data, and store it in the cache. If the cache is full, however, "old" data must first be removed from the cache to make room for the recently accessed data. The old data is typically processed by a compression engine to recompress the data and store it back in partition 44.

The amount of processing required to recompress the data prior to storage in partition 44 is reduced by using a partial recompression algorithm whereby only the frames storing the logical blocks that were updated while in the cache, as well as the frames thereafter in the chain, are recompressed. Various compression algorithms of this type may be used. In addition, by sorting the logical blocks in the manner discussed herein, the number of frames that are recompressed in response to a cache write back operation is typically reduced.

Figure 6:
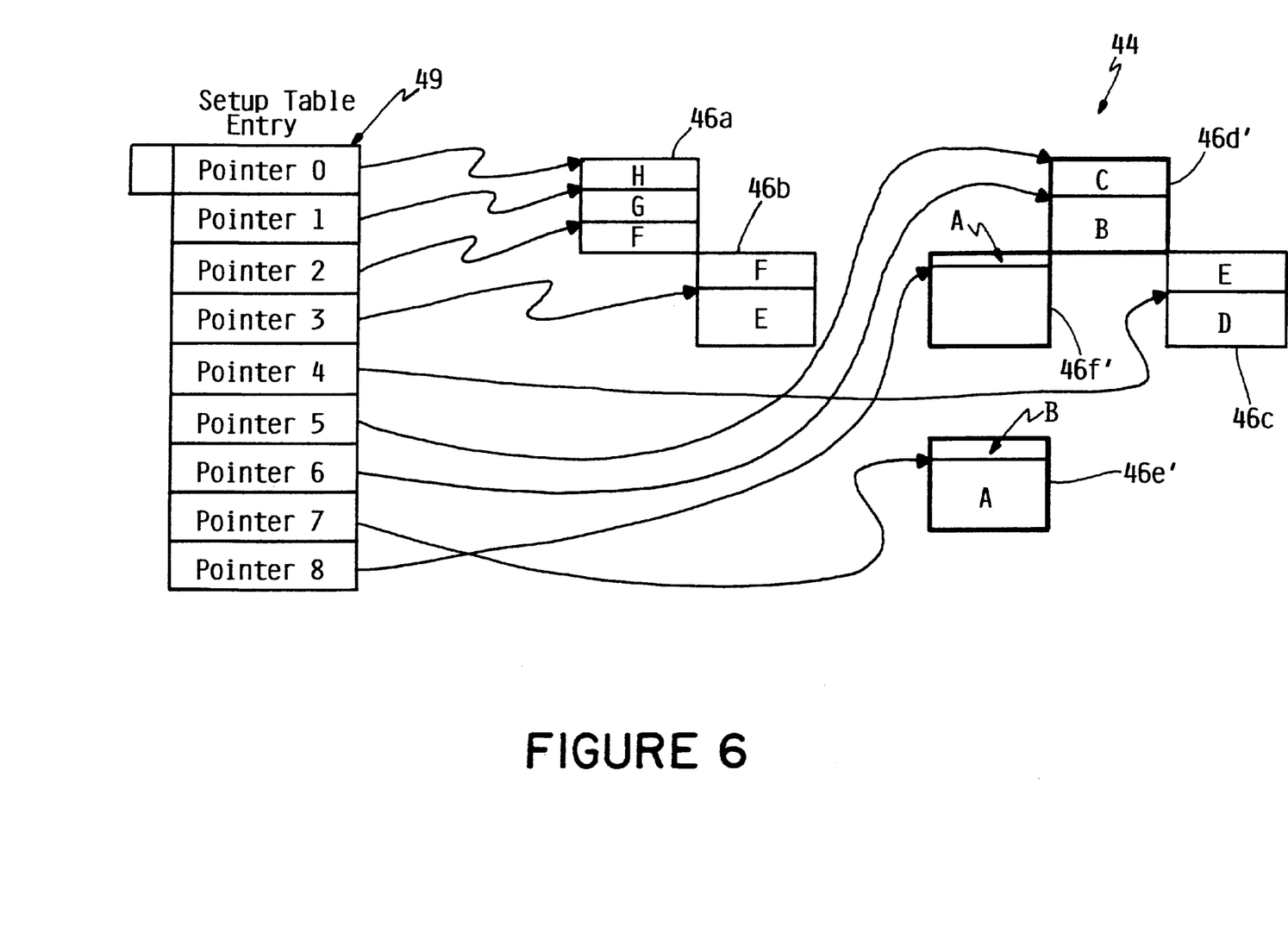
FIG. 6 is a block diagram illustrating the results of an exemplary data modification to the array of logical blocks of FIG. 5.

For example, in the illustrated embodiment of FIG. 5, assuming modifications to blocks A and B are twice as frequent as modifications to blocks G and H, the more frequent modifications to blocks A and B typically require recompression of only three frames, frames 46d–46f, compared to six frames, frames 46a–46f, for modifications to blocks G and H. FIG. 6 illustrates exemplary results of a recompression of logical page 45 as a result of an update to the data in logical block B. After recompression, logical block B is shown as occupying a smaller memory space as a result of a higher compression ratio after recompression. After the update, only three frames, now designated frames 46d'–46f', are recompressed as a result of the update.

It will be appreciated that the various applications, programs, and computer processes which may implement the various embodiments of the invention may be resident at different times on one or more program storage devices, which may include any device or apparatus capable of storing information such as data or program code either in a volatile or non-volatile manner. Accordingly, a program storage device may comprise memory devices such as RAMs, ROMs, EPROMs, processor and cache memories, flash memories, customized integrated circuits, etc., as well as fixed or removable mass storage medias such as fixed or removable magnetic disks, CD-ROMs, magnetic tape, etc. In addition, it will be appreciated that the various applications, programs, and computer processes, generically "program products", may be transferred or downloaded to a computer system via network or modem in lieu of being provided on a storage media such as a floppy disk or CD-ROM, typically by first establishing a connection between the computer system and a server-type computer, and thereafter transmitting the program product to the computer system. Thus, it will be appreciated that a program storage device may also include any of the aforementioned memory and storage media of a server-type computer, e.g., a bulletin board or ftp site, which downloads or transfers a program product to other computer systems but does not actually execute the downloaded or transferred program product.

Various modifications may be made to the illustrated embodiments without departing from the spirit and scope of the invention. Therefore, the invention lies solely in the claims hereinafter appended.

What is claimed is:

1. A method of maintaining an array including a plurality of array elements in a memory, the method comprising the steps of:

(a) sorting array elements according to a sorting algorithm which arranges array elements in the memory based upon probability of modification, wherein array elements proximate a first end of the array have a lower probability of modification than array elements proximate a second end of the array; and (b) in response to a modification of a selected array element, updating at least one subsequent array element, if any, that follows the selected array element in the array.

2. The method of claim 1, wherein the updating step is performed in response to a deletion, an addition, or a modification of size of the selected array element.

3. The method of claim 1, wherein the updating step comprises moving the subsequent array element in the memory space.

4. The method of claim 3, wherein the updating step comprises maintaining the array elements in a contiguous memory space.

5. The method of claim 1, wherein the first end of the array represents the beginning of the array, and wherein the sorting step sorts the array elements in reverse order.

6. The method of claim 5, wherein the array is representative of a logical page of memory, with each array element representative of a logical block of memory in the logical page; whereby the array elements representative of the lower order logical blocks in the logical page are disposed proximate the second end of the array.

7. The method of claim 6, wherein the array elements are stored in a plurality of frames in a compressed format, and wherein, in response to a modification of data in the selected array element, the updating step recompresses only frames in which are stored at least a portion of the selected array element or a subsequent array element in the array.

8. A computer system, comprising:
   (a) a memory configured and arranged to store an array including a plurality of array elements; and
   (b) a controller, coupled to the memory, the controller storing the plurality of array elements according to a sorting algorithm which arranges array elements in the memory based upon probability of modification, wherein array elements proximate a first end of the array have a lower probability of modification than array elements proximate a second end of the array, and wherein in response to a modification of a selected array element, the controller updates at least one subsequent array element, if any, that follows the selected array element in the array.

9. The computer system of claim 8, wherein the controller updates the subsequent array element in response to a deletion, an addition, or a modification of size of the selected array element, and by moving the subsequent array element in the memory space.

10. The computer system of claim 8, wherein the first end of the array represents the beginning of the array, and wherein the controller sorts the array elements in reverse order.

11. The computer system of claim 10, wherein the controller stores the array elements in a plurality of frames in a compressed format, and wherein, in response to a modification of data in the selected array element, the controller recompresses only frames in which are stored at least a portion of the selected array element or a subsequent array element in the array.

12. A program storage device readable by a computer system, the program storage device tangibly embodying a program of instructions executable by the computer system to perform a method of maintaining an array including a plurality of array elements in a memory space, the method comprising the steps of:
   (a) sorting array elements according to a sorting algorithm which arranges array elements in the memory space based upon probability of modification, wherein array elements proximate a first end of the array have a lower probability of modification than array elements proximate a second end of the array; and
   (b) in response to a modification of a selected array element, updating at least one subsequent array element, if any, that follows the selected array element in the array.

13. A method of transmitting a program product to a computer system, the method comprising the steps of:
   (a) establishing a connection with the computer system; and
   (b) transmitting the program product to the computer system, the program product being executable by the computer system to perform a method of maintaining an array including a plurality of array elements in a memory, the method comprising the steps of:
      (1) sorting array elements according to a sorting algorithm which arranges array elements in the memory based upon probability of modification, wherein array elements proximate a first end of the array have a lower probability of modification than array elements proximate a second end of the array; and
      (2) in response to a modification of a selected array element, updating at least one subsequent array element, if any, that follows the selected array element in the array.

14. A method of storing data in a computer system of the type including a memory partitioned into a plurality of pages, with each page including data stored in a plurality of blocks, the method comprising the steps of:
   (a) storing data to the memory in a compressed format, and with the blocks in each page arranged in reverse order; and
   (b) modifying data stored in a selected block in a selected page in the memory, including the step of updating the selected block and at least one subsequent block, if any, arranged thereafter in the selected page.

15. The method of claim 14, wherein the updating step comprises moving the subsequent block.

16. The method of claim 14, wherein the updating step comprises recompressing the selected and subsequent block.

17. The method of claim 16, wherein the storing step stores the blocks in each page in a plurality of fixed size frames, and wherein the updating step recompresses only frames in which are stored at least a portion of the selected block or a subsequent block.

18. A computer system, comprising:
   (a) a memory configured and arranged to store a logical page of data, the logical page including a plurality of blocks forming an array; and
   (b) a controller, coupled to the memory, the controller storing the plurality of blocks in the memory in a compressed format and in reverse order relative to the arrangements of blocks in the logical page, wherein, in response to a modification of data in a selected block, the controller updates the selected block and at least one subsequent block, if any, arranged thereafter in the memory.

19. The computer system of claim 18, further comprising a compression engine coupled to the controller.

20. The computer system of claim 18, wherein the controller updates the selected and subsequent blocks by recompressing the data therein.

21. The computer system of claim 20, wherein the controller stores the plurality of blocks in a plurality of fixed size frames, and wherein the controller updates the selected and subsequent block by recompressing only frames in which are stored at least a portion of the selected block or a subsequent block.

22. A program storage device readable by a computer system, the program storage device tangibly embodying a program of instructions executable by the computer system to perform a method of storing data in the computer system, the computer system including a memory partitioned into a plurality of pages, with each page including data stored in a plurality of blocks, and the method comprising the steps of:
   (a) storing data to the memory in a compressed format, and with the blocks in each page arranged in reverse order; and
   (b) modifying data stored in a selected block in a selected page in the memory, including the step of updating the selected block and at least one subsequent block, if any, arranged thereafter in the selected page.

23. A method of transmitting a program product to a computer system, the method comprising the steps of:

(a) establishing a connection with the computer system; and (b) transmitting the program product to the computer system, the program product being executable by the computer system to perform a method of storing data in the computer system, the computer system including a memory that is partitioned into a plurality of pages, with each page including data stored in a plurality of blocks, and the method comprising the steps of:

(1) storing data to the memory in a compressed format, and with the blocks in each page arranged in reverse order; and (2) modifying data stored in a selected block in a selected page in the memory, including the step of updating the selected block and at least one subsequent block, if any, arranged thereafter in the selected page.

* * * * *